US010936532B2

(12) United States Patent
Yamada et al.

(10) Patent No.: US 10,936,532 B2
(45) Date of Patent: Mar. 2, 2021

(54) ELECTRONIC DEVICE AND DATA TRANSMITTING/RECEIVING METHOD

(71) Applicant: Toshiba Memory Corporation, Tokyo (JP)

(72) Inventors: Naoko Yamada, Kanagawa (JP); Teruji Yamakawa, Tokyo (JP)

(73) Assignee: TOSHIBA MEMORY CORPORATION, Tokyo (JP)

( * ) Notice: Subject to any disclaimer, the term of this patent is extended or adjusted under 35 U.S.C. 154(b) by 70 days.

(21) Appl. No.: 16/280,997

(22) Filed: Feb. 20, 2019

(65) Prior Publication Data

US 2020/0042490 A1 Feb. 6, 2020

(30) Foreign Application Priority Data

Aug. 6, 2018 (JP) ................. 2018-147682

(51) Int. Cl.
| | |
|---|---|
| *G06F 15/167* | (2006.01) |
| *G06F 13/40* | (2006.01) |
| *G06F 15/177* | (2006.01) |
| *G06F 13/42* | (2006.01) |
| *G06F 13/12* | (2006.01) |
| *H04L 12/58* | (2006.01) |

(52) U.S. Cl.
CPC .......... *G06F 15/167* (2013.01); *G06F 13/122* (2013.01); *G06F 13/126* (2013.01); *G06F 13/404* (2013.01); *G06F 13/4234* (2013.01); *G06F 15/177* (2013.01); *H04L 51/22* (2013.01); *H04L 51/24* (2013.01)

(58) Field of Classification Search
CPC ................. H04L 51/22; H04L 51/24
See application file for complete search history.

(56) References Cited

U.S. PATENT DOCUMENTS

| 5,893,096 A | 4/1999 | Nakamura | |
|---|---|---|---|
| 5,968,117 A * | 10/1999 | Schuetze | H04L 51/066 709/206 |
| 6,941,348 B2 * | 9/2005 | Petry | H04L 51/12 709/206 |
| 6,959,325 B2 * | 10/2005 | Gardner | H04L 29/06 379/67.1 |

(Continued)

FOREIGN PATENT DOCUMENTS

JP 2005507106 A 3/2005

*Primary Examiner* — Lashonda T Jacobs
(74) *Attorney, Agent, or Firm* — Kim & Stewart LLP

(57) ABSTRACT

An electronic device includes a first device, a second device, and a storage area shared by the first device and the second device when performing mailbox communication between the first device and the second device. When transmitting first data from the first device to the second device via the mailbox communication, the first device stores first data in the storage area. The second device, which has stored therein an identifier of a device permitted to transmit data to the second device via the mailbox communication, obtains an identifier of the first device, and compares the obtained identifier to the identifier stored in the second device to determine whether acquisition of the first data from the storage area is permitted. When the acquisition of the first data from the storage area is determined to be permitted, the second device reads the first data from the storage area.

19 Claims, 13 Drawing Sheets

(56) References Cited

U.S. PATENT DOCUMENTS

| | | | | |
|---|---|---|---|---|
| 7,730,136 | B2* | 6/2010 | Smith | G06Q 10/107 |
| | | | | 709/206 |
| 7,739,336 | B2* | 6/2010 | Gorty | G06Q 10/107 |
| | | | | 709/206 |
| 8,650,103 | B2 | 2/2014 | Wilf et al. | |
| 8,874,669 | B2* | 10/2014 | Bengtsson | H04L 67/1095 |
| | | | | 709/206 |
| 9,264,389 | B2* | 2/2016 | Endo | H04L 51/22 |
| 9,730,044 | B2 | 8/2017 | Dabbiere et al. | |
| 2003/0188060 | A1* | 10/2003 | Van Hensbergen | G06F 13/4059 |
| | | | | 710/100 |
| 2007/0136598 | A1* | 6/2007 | Endo | H04N 1/4486 |
| | | | | 713/176 |
| 2010/0250498 | A1* | 9/2010 | Andersen | G06Q 10/10 |
| | | | | 707/661 |
| 2012/0047264 | A1* | 2/2012 | Parthasarathy | H04L 51/14 |
| | | | | 709/226 |
| 2012/0136856 | A1 | 5/2012 | Fitzpatrick et al. | |
| 2012/0278409 | A1* | 11/2012 | Kinoshita | H04L 12/66 |
| | | | | 709/206 |
| 2015/0370482 | A1* | 12/2015 | Mito | G06F 3/0622 |
| | | | | 711/156 |
| 2016/0253339 | A1* | 9/2016 | Ambrose | G06F 3/0647 |
| | | | | 707/693 |
| 2017/0228302 | A1* | 8/2017 | Chiang | G06F 11/3041 |
| 2018/0307629 | A1* | 10/2018 | Villatel | G06F 9/445 |
| 2019/0342239 | A1* | 11/2019 | Brandt | G06F 16/176 |

\* cited by examiner

ELECTRONIC DEVICE AND DATA TRANSMITTING/RECEIVING METHOD

CROSS-REFERENCE TO RELATED APPLICATIONS

This application is based upon and claims the benefit of priority from. Japanese Patent Application No. 2018-147682, filed Aug. 6, 2018, the entire contents of which are incorporated herein by reference.

FIELD

Embodiments described herein relate generally to an electronic device and a data transmitting/receiving method.

BACKGROUND

As one type of communication method between CPUs, there is a mailbox communication in which data is transmitted and received between the CPUs via a shared memory.

A data recipient via mailbox communication does not employ a method of checking the data transmitter, and thus may receive data from an unintended transmitter and may execute unintended processing. Checking of the data transmitter may be performed using confidential information, but a method that requires sharing of confidential information between the data transmitter and the data recipient for each mailbox communication would be difficult to implement in an electronic device that requires real-time communications.

DETAILED DESCRIPTION

Embodiments provide an electronic device and a data transmitting/receiving method, which efficiently checks for and prevents interruptions by a third party.

In general, according to one embodiment, an electronic device includes a first device, a second device, and a storage area. The storage area is shared by the first device and the second device. Data is transmitted and received via the storage area in a mailbox communication. When transmitting first data from the first device to the second device via the mailbox communication, the first device stores the first data in the storage area. The second device, which has stored therein an identifier of a device permitted to transmit data to the second device via the mailbox communication, obtains an identifier of the first device, compares the obtained identifier with the identifier stored in the second device to determine whether acquisition of the first data from the storage area is permitted, and reads the first data from the storage area when the acquisition of the first data from the storage area is determined to be permitted.

Hereinafter, embodiments will be described with reference to the accompanying drawings.

First Embodiment

Figure 1:
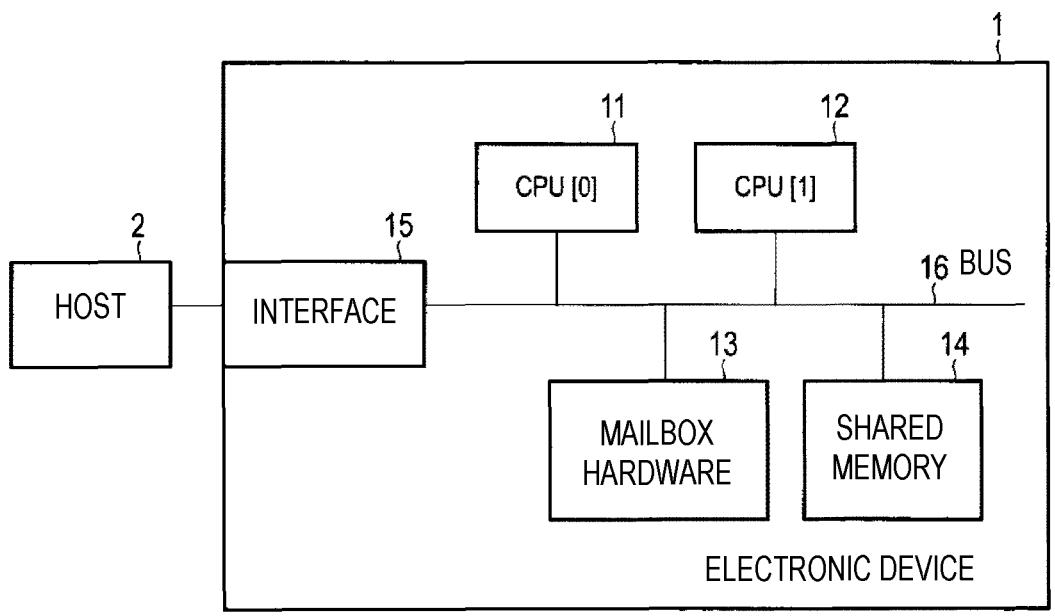
FIG. 1 is a view illustrating a configuration example and a connection example of an electronic device according to a first embodiment.

FIG. 1 is a view illustrating a configuration example and a connection example of an electronic device 1 according to a first embodiment. The electronic device 1 is, for example, a storage device such as a solid state drive (SSD) that stores data in a NAND flash memory or a hard disk drive (HDD) that stores data in a hard disk (not illustrated in FIG. 1). The electronic device 1 is connected to a host 2 via an interface such as a PCIe® interface. As illustrated in FIG. 1, the electronic device 1 includes a CPU[0] 11, a CPU[1] 12, mailbox hardware 13, shared memory 14 such as a DRAM, and an interface 15. These are connected to each other via a bus 16. The CPU [0] 11, the CPU[1] 12, the mailbox hardware 13, the shared memory 14, and the interface 15, which are connected via the bus 16, may also be configured as, for example, a system on a chip (SoC).

Here, in the electronic device 1, it is assumed that the interface 15 accepts a request from the host 2, that the CPU[0] 11 and the CPU[1] 12 cooperatively execute a processing corresponding to the request, and that the interface 15 transmits the processing result to the host 2. Here, it is assumed that data is transferred from the CPU[0] 11 to the CPU[1] 12, and the CPU[1] 12 executes the processing corresponding to the request from the host 2 by using data received from the CPU [0] 11. The data transfer from the CPU [0] 11 to the CPU [1] 12 is performed via the shared memory 14. That is, data transmission/reception between the CPU[0] 11 and the CPU[1] 12 is performed via a mailbox communication. In the electronic device 1 according to the embodiment, the mailbox hardware 13 arbitrates the mailbox communication.

Here, it is assumed that a mailbox communication is performed in connection with the data transfer from the CPU[0] 11 to the CPU[1] 12. However, a data transfer from the CPU[1] 12 to the CPU[0] 11 may also be performed via a mailbox communication. A mailbox communication may also be performed with respect to hardware such as an application specific integrated circuit (ASIC) (not illustrated in FIG. 1). Here, a mailbox communication using the shared memory 14 is given as an example. The present disclosure is not limited to using the shared memory 14. The mailbox communication may use, for example, a register.

Figure 2:
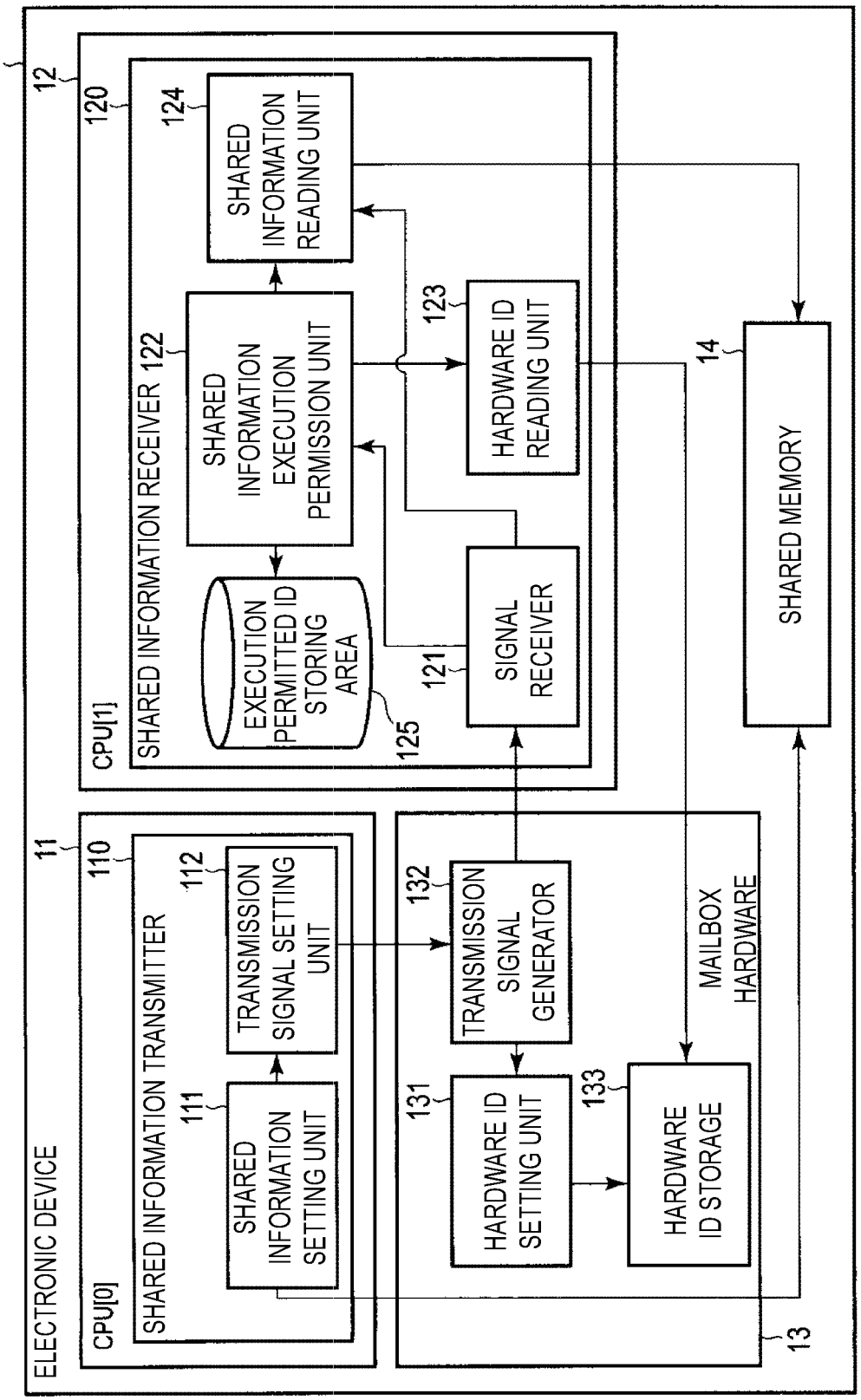
FIG. 2 is a block diagram illustrating a functional configuration of the electronic device according to the first embodiment.

FIG. 2 is a block diagram illustrating a functional configuration of the electronic device 1 according to the embodiment.

As illustrated in FIG. 2, the CPU[0] 11 on the data transmitting side includes a shared information transmitter 110, and the CPU[1] 12 on the data receiving side includes a shared information receiver 120. Here, since descriptions will be made on a case where data is transferred from the CPU [ 0] 11 to the CPU[1] 12, as an example, the shared information transmitter 110 is illustrated only in the CPU[0] 11, and the shared information receiver 120 is illustrated only in the CPU[1] 12. However, as described above, since a data transfer from the CPU[1] 12 to the CPU[0] 11 via a mailbox communication may also be performed, both the shared information transmitter 110 and the shared information receiver 120 are provided in each of the CPU[0] 11 and the CPU[1] 12.

The shared information transmitter 110 includes controlling units such as a shared information setting unit 111 and a transmission signal setting unit 112. Each controlling unit of the shared information transmitter 110 may be implemented by executing, for example, a program stored in a storage in the electronic device 1 by the CPU[0] 11, or may be a dedicated integrated circuit (e.g., electric circuit). That is, each controlling unit of the shared information transmitter 110 may be implemented by not only software but also hardware. Some may be implemented by software, and others may be implemented by hardware.

The shared information setting unit 111 stores communication data in the shared memory 14. The shared information setting unit 111 notifies the transmission signal setting unit 112 of information indicating a storing location of the communication data in the shared memory 14 (e.g., a pointer). The transmission signal setting unit 112 requests that the mailbox hardware 13 generate a mailbox transmission signal for the CPU[1] 12, which is an interrupt signal for notifying a data transfer via a mailbox communication. At the time of this request, the transmission signal setting unit 112 transmits the pointer, which is obtained by the notification from the shared information setting unit 111, to the mailbox hardware 13.

The shared information receiver 120 includes controlling units such as a signal receiver 121, a shared information execution permission unit 122, a hardware ID reading unit 123, and a shared information reading unit 124, and a data area such as an execution permitted ID storing area 125. The execution permitted ID storing area 125 is provided in a storing area of a storage in the electronic device 1, such as a RAM, a NAND flash memory, or a hard disk, which is accessible by a controlling unit such as the shared information reading unit 124. Alternatively, registers in the CPU[1] 12 may be allocated as the execution permitted ID storing area 125. Each controlling unit of the shared information receiver 120 may also be implemented by executing, for example, a program stored in a storage within the electronic device 1 by the CPU[1] 12, or may be a dedicated integrated circuit (e.g., electric circuit). That is, each controlling unit of the shared information receiver 120 may also be implemented by not only software, but also hardware. Some may be implemented by software, and others may be implemented by hardware.

The signal receiver 121 receives a mailbox transmission signal from the mailbox hardware 13. The mailbox transmission signal includes the above described pointer. The shared information execution permission unit 122 determines whether a mailbox communication corresponding to the mailbox transmission signal received by the signal receiver 121 is permitted to be executed. Specifically, the shared information execution permission unit 122 permits execution of the mailbox communication when a hardware ID read from the mailbox hardware 13 by the hardware ID reading unit 123, which is to be described below, matches a hardware ID stored in the execution permitted ID storing area 125.

The hardware ID is an identifier that identifies each hardware including the CPU[0] 11. The hardware ID may be any value as long as it is a value by which each hardware device is identifiable, and may be, for example, a bus ID assigned to each hardware with respect to use of the bus 16. The hardware ID may not be a unique value in the electronic device 1. For example, when there are plural hardware groups performing a mailbox communication in the electronic device 1, a value used in a certain group may be used in another group. For example, the same value may be used in respective processor cores performing a mailbox communication between the processor cores.

The hardware ID reading unit 123 reads the hardware ID from the mailbox hardware 13 in response to a request from the shared information execution permission unit 122. When the execution of the mailbox communication corresponding to the mailbox transmission signal received by the signal receiver 121 is permitted by the shared information execution permission unit 122 on the basis of the hardware ID read from the mailbox hardware 13 by the hardware ID reading unit 123, the shared information reading unit 124 reads communication data from the shared memory 14 by using the pointer included in the mailbox transmission signal.

The mailbox hardware 13 includes controlling units such as a hardware ID setting unit 131, a transmission signal generator 132, and a hardware ID storage 133. Each controlling unit of the mailbox hardware 13 may also be implemented by executing, for example, a program stored in a memory incorporated in the mailbox hardware 13 by a processor incorporated in the mailbox hardware 13, or may be a dedicated integrated circuit (electric circuit). That is, each controlling unit of the mailbox hardware 13 may also be implemented by not only software but also hardware. Some may be implemented by software, and others may be implemented by hardware.

The hardware ID setting unit 131 acquires a hardware ID of hardware that requests generation of a mailbox transmission signal, and requests that the hardware ID storage 133 store the acquired hardware ID. The hardware ID setting unit 131 acquires, for example, a bus ID as the hardware ID as described above. The transmission signal generator 132 generates the mailbox transmission signal, and transmits the mailbox transmission signal to hardware that is a data transfer destination. The mailbox transmission signal includes the pointer received from the CPU[0] 11. The hardware ID storage 133 stores the hardware ID received from the hardware ID setting unit 131.

Figure 3:
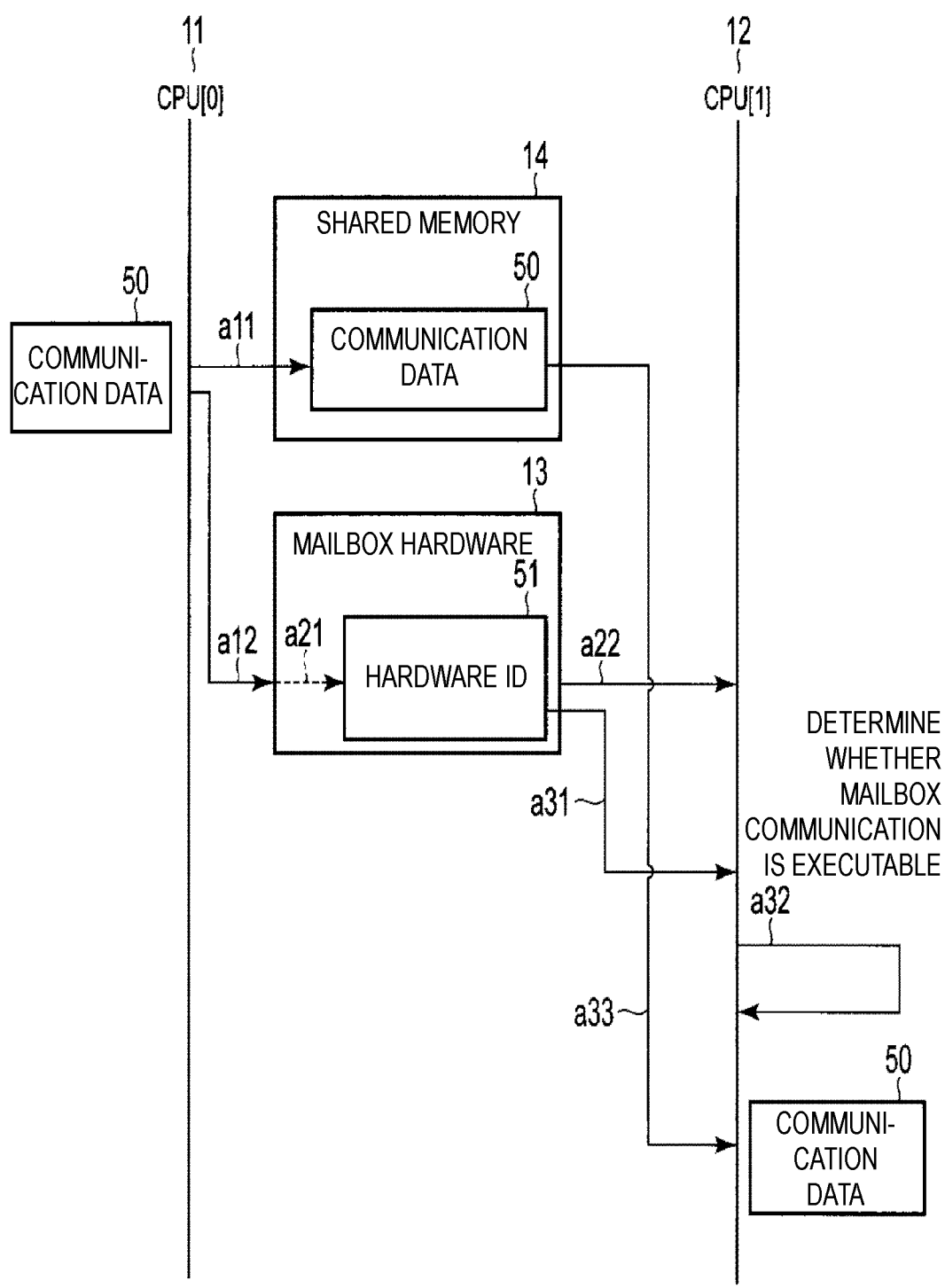
FIG. 3 is a view for explaining the flow of a mailbox communication processing in the electronic device according to the first embodiment.

Here, descriptions will be made on the flow of a mailbox communication processing from the CPU[0] 11 to the CPU [1] 12 in the electronic device 1 according to the embodiment, with reference to FIG. 3.

The CPU[0] 11 stores communication data 50 in the shared memory 14 (a11), and requests that the mailbox hardware 13 generate a mailbox transmission signal (a12).

When requested to generate the mailbox transmission signal, the mailbox hardware 13 stores a hardware ID of the CPU[0] 11 as a requestor (a21), and generates and transmits the mailbox transmission signal to the CPU[1] 12 that is a data transfer destination (a22).

The CPU[1] 12, which receives the mailbox transmission signal, first reads the hardware ID from the mailbox hardware 13 (a31). The CPU[1] 12 compares the read hardware ID with a hardware ID stored in the CPU[1] 12 to determine whether reading of the communication data 50 from the shared memory 14 is possible, that is, whether a mailbox communication is permitted to be executed (a32). Here, it is assumed that the CPU[0] 11 is an authorized counterpart of the CPU[1] 12 and a hardware ID of the CPU[0] 11 is stored in the CPU [1] 12. When hardware IDs match each other, the CPU[1] 12 permits reading of the communication data 50, and then reads the communication data 50 from the shared memory 14 (a33). When the hardware IDs do not match, the CPU[1] 12 detects that the communication is an unauthorized mailbox communication.

In the electronic device 1 according to the embodiment in which it is unnecessary to share confidential information between a transmission side and a reception side, and the hardware ID is checked via the mailbox hardware 13, it is possible to efficiently prevent an interruption to a mailbox communication by a third party.

Figure 4:
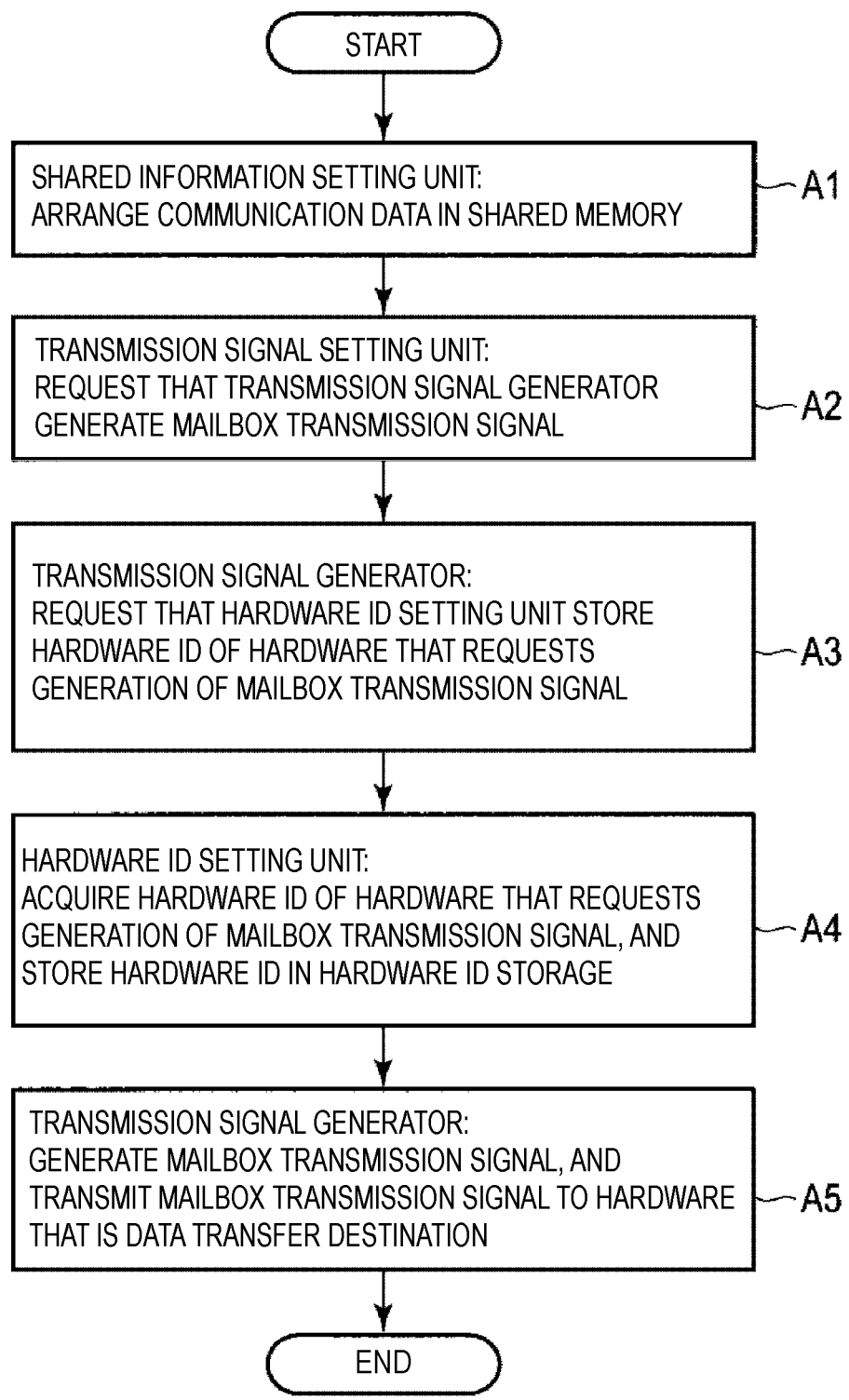
FIG. 4 is a flow chart illustrating steps of mailbox transmission in the electronic device according to the first embodiment.

FIG. 4 is a flow chart illustrating steps of mailbox transmission in the electronic device 1. The shared information setting unit 111 arranges communication data in the shared memory 14 (step A1). The transmission signal setting unit 112 requests that the mailbox hardware 13, more specifically, the transmission signal generator 132 generate a mailbox transmission signal (step A2).

Upon receiving this request, the transmission signal generator 132 requests that the hardware ID setting unit 131 store a hardware ID of hardware that has requested generation of the mailbox transmission signal (step A3). Upon receiving this request, the hardware ID setting unit 131 acquires the hardware ID of the hardware that has requested generation of the mailbox transmission signal, and stores the hardware ID in the hardware ID storage 133 (step A4).

The transmission signal generator 132 generates the mailbox transmission signal, and transmits the mailbox transmission signal to hardware that is a data transfer destination, more specifically, the shared information receiver 120 (step A5).

Figure 5:
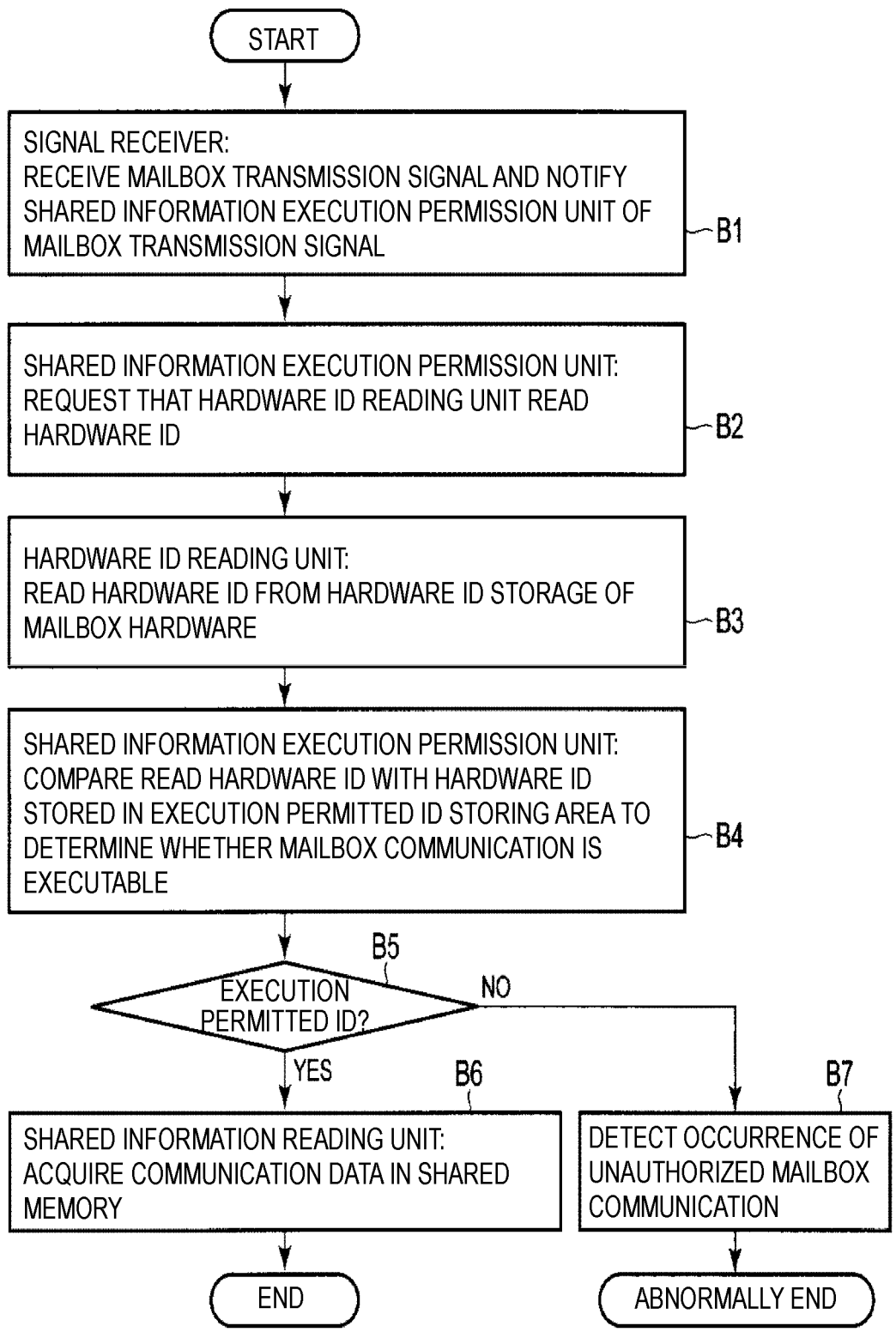
FIG. 5 is a flow chart illustrating steps of mailbox reception in the electronic device according to the first embodiment.

FIG. 5 is a flow chart illustrating steps of mailbox reception in the electronic device 1.

The signal receiver 121 receives the mailbox transmission signal, and notifies the shared information execution permission unit 122 of the mailbox transmission signal (step B1). Upon receiving this notification, the shared information execution permission unit 122 requests that the hardware ID reading unit 123 read the hardware ID from the mailbox hardware 13 (step B2). Upon receiving this request, the hardware ID reading unit 123 reads the hardware ID from the mailbox hardware 13, more specifically, the hardware ID storage 133 (step B3).

The shared information execution permission unit 122 compares the hardware ID read by the hardware ID reading unit 123 with a hardware ID stored in the execution permitted ID storing area 125 to determine whether a mailbox communication is permitted to be executed (step B4). When the hardware ID read by the hardware ID reading unit 123 matches the hardware ID stored in the execution permitted ID storing area 125, that is, an execution permitted ID (step B5: YES), the shared information reading unit 124 acquires communication data in the shared memory 14 by using a pointer included in the mailbox transmission signal (step B6). When the hardware ID does not match the execution permitted ID (step B5: NO), the shared information execution permission unit 122 detects occurrence of an unauthorized mailbox communication (step B7), and abnormally ends the electronic device 1. For example, the host 2 is notified of the occurrence of the unauthorized mailbox communication, and the electronic device 1 becomes inoperable.

In this manner, the electronic device 1 according to the embodiment efficiently prevents an interruption to a communication by a third party.

Second Embodiment

Next, a second embodiment will be described. The same constituent elements as those in the first embodiment will be denoted by the same reference numerals, and redundant explanations thereof will be omitted.

Figure 6:
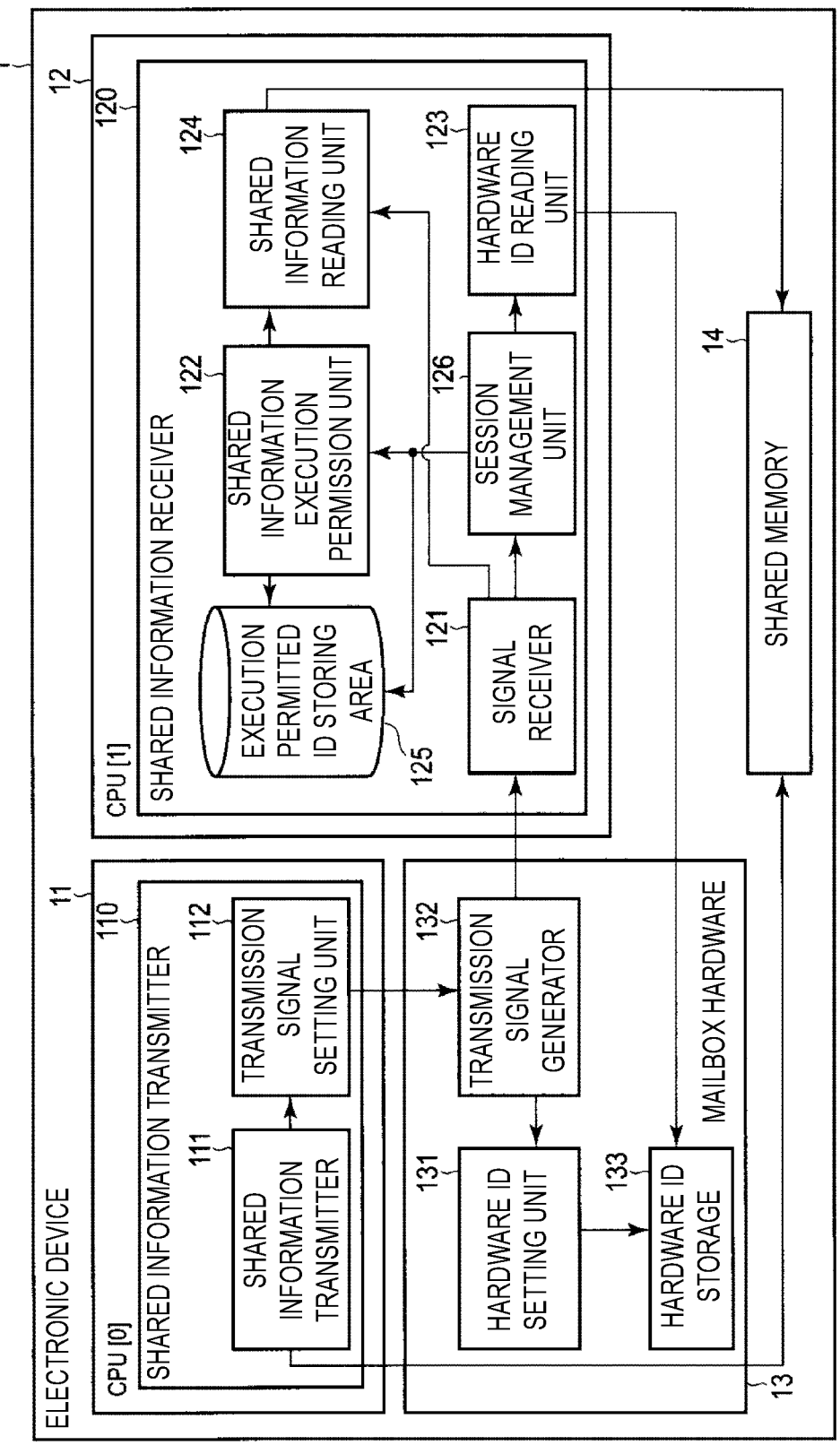
FIG. 6 is a block diagram illustrating a functional configuration of an electronic device according to a second embodiment.

FIG. 6 is a block diagram illustrating a functional configuration of the electronic device 1 according to the embodiment.

As illustrated in FIG. 6, in the embodiment, the shared information receiver 120 includes a session management unit 126. In a mailbox communication between the CPU[0] 11 and the CPU[1] 12, data exchange is performed among the CPU[0] 11, the mailbox hardware 13 and the shared memory 14, and data exchange is performed among the CPU[1] 12, the mailbox hardware 13 and the shared memory 14. That is, in a mailbox communication, the CPU[0] 11 and the CPU[1] 12 do not directly communicate with each other. Thus, originally, a session for a communication via the bus 16 does not need to be established between the CPU[0] 11 and the CPU[1] 12.

In the embodiment, a session is established between a transmission side and a reception side in a mailbox communication so that the reception side that is retrieving data from the shared memory 14 checks whether the data stored in the shared memory 14 is data stored by an authorized counterpart. Specifically, when retrieving data from the CPU[0] 11, from the shared memory 14, the CPU[1] 12 uses information obtained by the establishment of the session in checking the CPU[0] 11. The session management unit 126 of the shared information receiver 120 performs management on the session, such as checking of a session state or determining on an acceptance propriety of a session.

Figure 7:
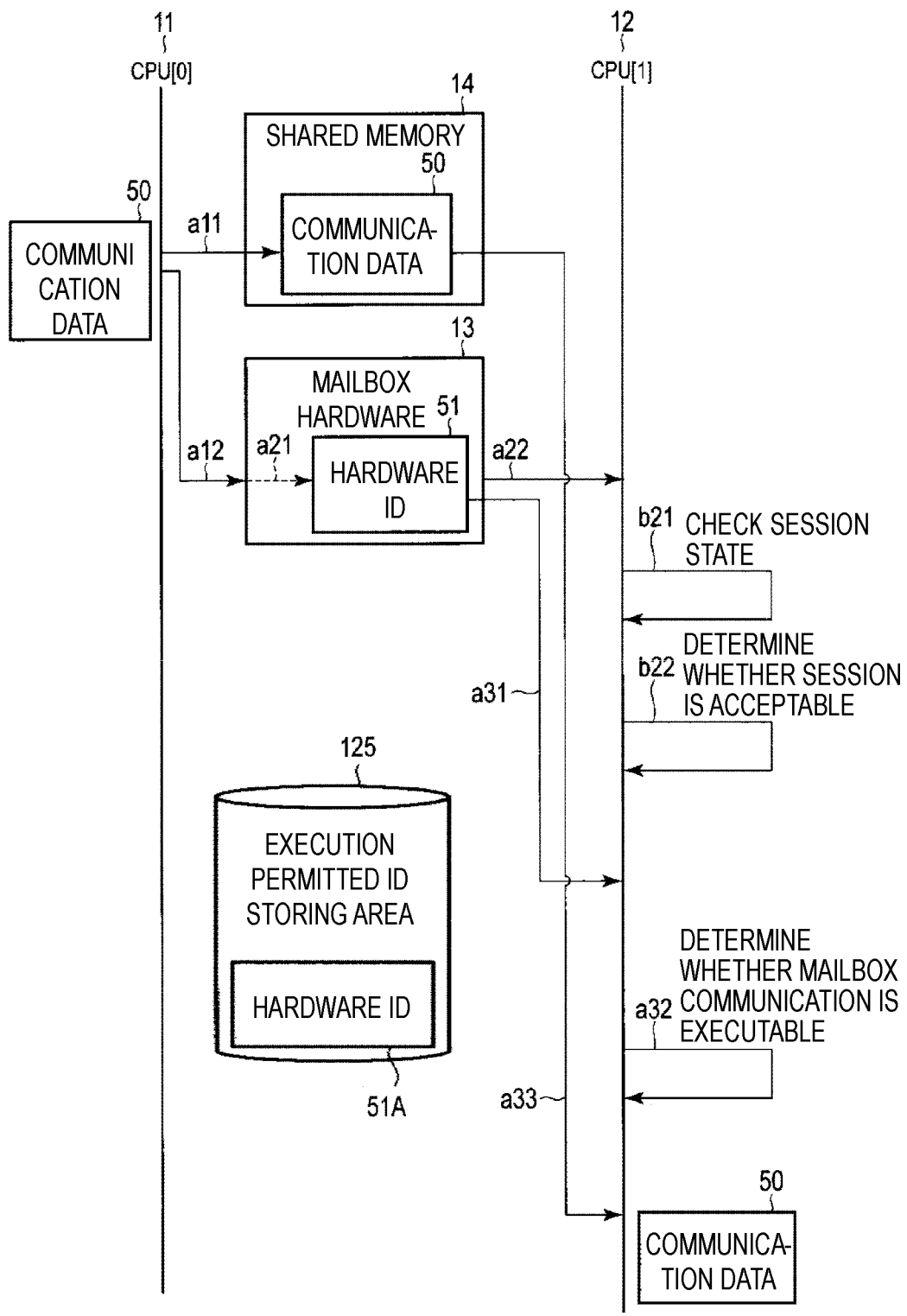
FIG. 7 is a view for explaining the flow of a mailbox communication processing in the electronic device according to the second embodiment.

Here, descriptions will be made on the flow of a mailbox communication processing from the CPU[0] 11 to the CPU [1] 12 in the electronic device 1 according to the embodiment, with reference to FIG. 7.

The processing flow until the mailbox hardware 13 transmits a mailbox transmission signal to the CPU[1] 12 is the same as that in the first embodiment (a11 to a12, and a21 to a22). Here, it is assumed that a session has not been established between the CPU[0] 11 and the CPU[1] 12.

Upon receiving the mailbox transmission signal, the CPU [1] 12 checks a session state (b21). When there is no session, the CPU [ 1] 12 performs a session acceptance processing to determine whether a corresponding session is acceptable (b22). The CPU[1] 12 determines whether the session is acceptable depending on, for example, whether a passphrase, which is certain confidential information exchanged with the CPU[0] 11 in advance, matches. Upon determining that the session is acceptable, the CPU[1] 12 stores a hardware ID of the CPU[0] 11 (a hardware ID 51A in the execution permitted ID storing area 125). As described above, here, a bus ID assigned to the CPU[0] 11 with respect to use of the bus 16 may be stored as a hardware ID. In the embodiment, in the execution permitted ID storing area 125, one hardware ID of a counterpart for which a session is established is stored.

Because the hardware ID is stored, reading of communication data 50 from the shared memory 14 is permitted (a31 to a32). Then, the CPU[1] 12 reads the communication data 50 from the shared memory 14 (a33). In this way, for example by refusing acceptance of a session from a party whose passphrase is not matched that is not an authorized counterpart, the CPU[1] 12 can prevent reception of data via a mailbox communication from a party other than the authorized counterpart.

Figure 8:
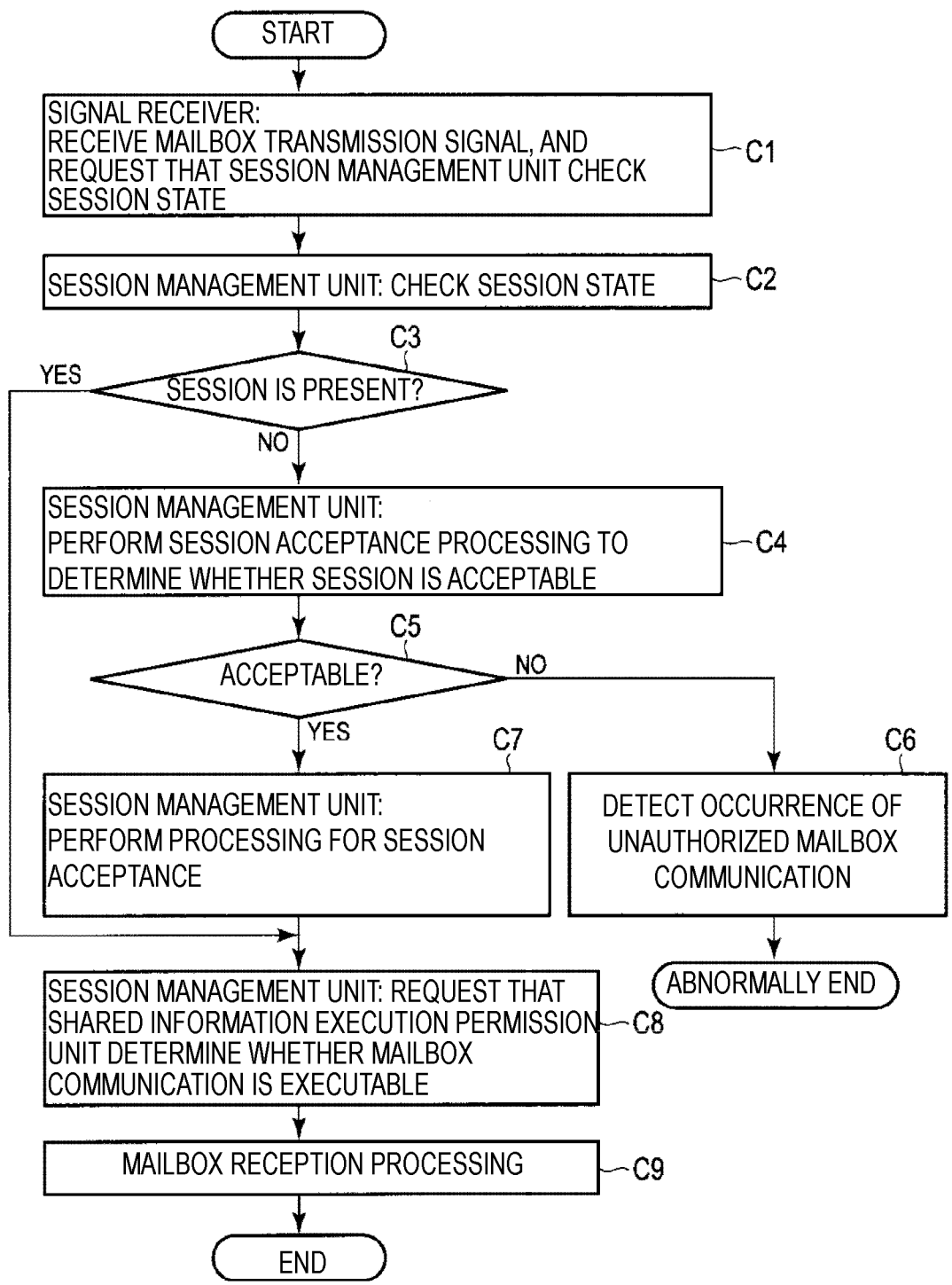
FIG. 8 is a flow chart illustrating steps of mailbox reception in the electronic device according to the second embodiment.

When a mailbox communication from the CPU[0] 11 to the CPU[1] 12 is executed plural times consecutively, all sessions between the CPU[0] 11 and the CPU[1] 12 may be continuously maintained until completion, or may be established each time. FIG. 8 is a flow chart illustrating steps of mailbox reception in the electronic device 1 according to the embodiment.

The signal receiver 121 receives a mailbox transmission signal, and requests that the session management unit 126 check a session state (step C1). Specifically, a request to check whether a session is currently present in the CPU[1] 12 is made. Upon receiving this request, the session management unit 126 checks the session state (step C2). When there is no session (step C3: NO), the session management unit 126 performs a session acceptance processing to determine whether a session is acceptable (step C4). The session management unit 126 determines whether the corresponding session is acceptable depending on, for example, whether a passphrase, which is exchanged with the CPU[0] 11 in advance, matches. When the session is not acceptable (step C5: NO), the session management unit 126 detects occurrence of an unauthorized mailbox communication (step C6), and abnormally ends the electronic device 1. For example, the host 2 is notified of the occurrence of the unauthorized mailbox communication, and the electronic device 1 becomes inoperable.

When the session is acceptable (step C5: YES), the session management unit 126 performs a processing for session acceptance (step C7). The processing for session acceptance will be described below with reference to FIG. 9. When the processing for session acceptance is performed or it is determined that there has been a session (step C3: YES), the session management unit 126 requests that the shared information execution permission unit 122 determine whether a mailbox communication is permitted to be executed (step C8). The determination of whether the mailbox communication is permitted to be executed is the same as in the first embodiment (FIG. 5: step B2 to step B5). When it is determined that the mailbox communication is permitted to be executed, the shared information reading unit 124 acquires communication data in the shared memory 14 (step C9).

Figure 9:
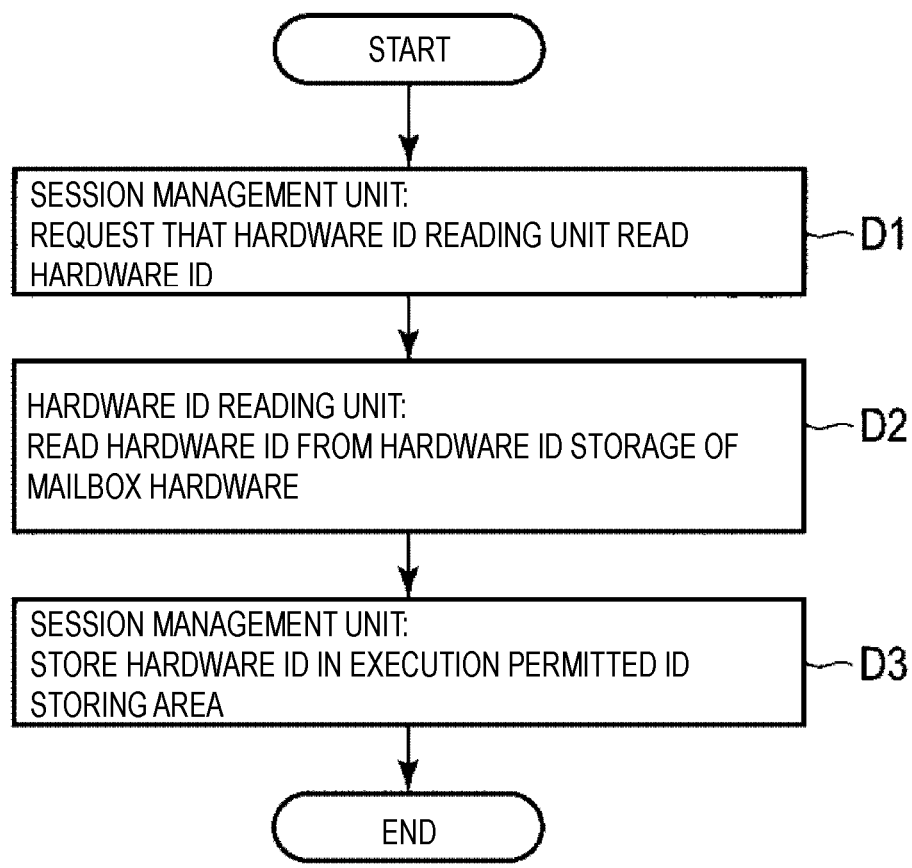
FIG. 9 is a flow chart illustrating steps of session acceptance in the electronic device according to the second embodiment.

FIG. 9 is a flow chart illustrating steps of session acceptance in the electronic device 1 according to the embodiment. The session management unit 126 requests that the hardware ID reading unit 123 read a hardware ID from the mailbox hardware (step D1). Upon receiving this request, the hardware ID reading unit 123 reads the hardware ID from the mailbox hardware 13, more specifically, from the hardware ID storage 133 (step D2). The session management unit 126 stores the hardware ID read by the hardware ID reading unit 123 in the execution permitted ID storing area 125 (step D3).

In this manner, the electronic device 1 according to the embodiment more reliably prevents an interruption to a mailbox communication by a third party by checking a session in the mailbox communication.

Third Embodiment

Next, a third embodiment will be described. The same constituent elements as those in the first or second embodiment will be denoted by the same reference numerals, and redundant explanations thereof will be omitted.

Figure 10:
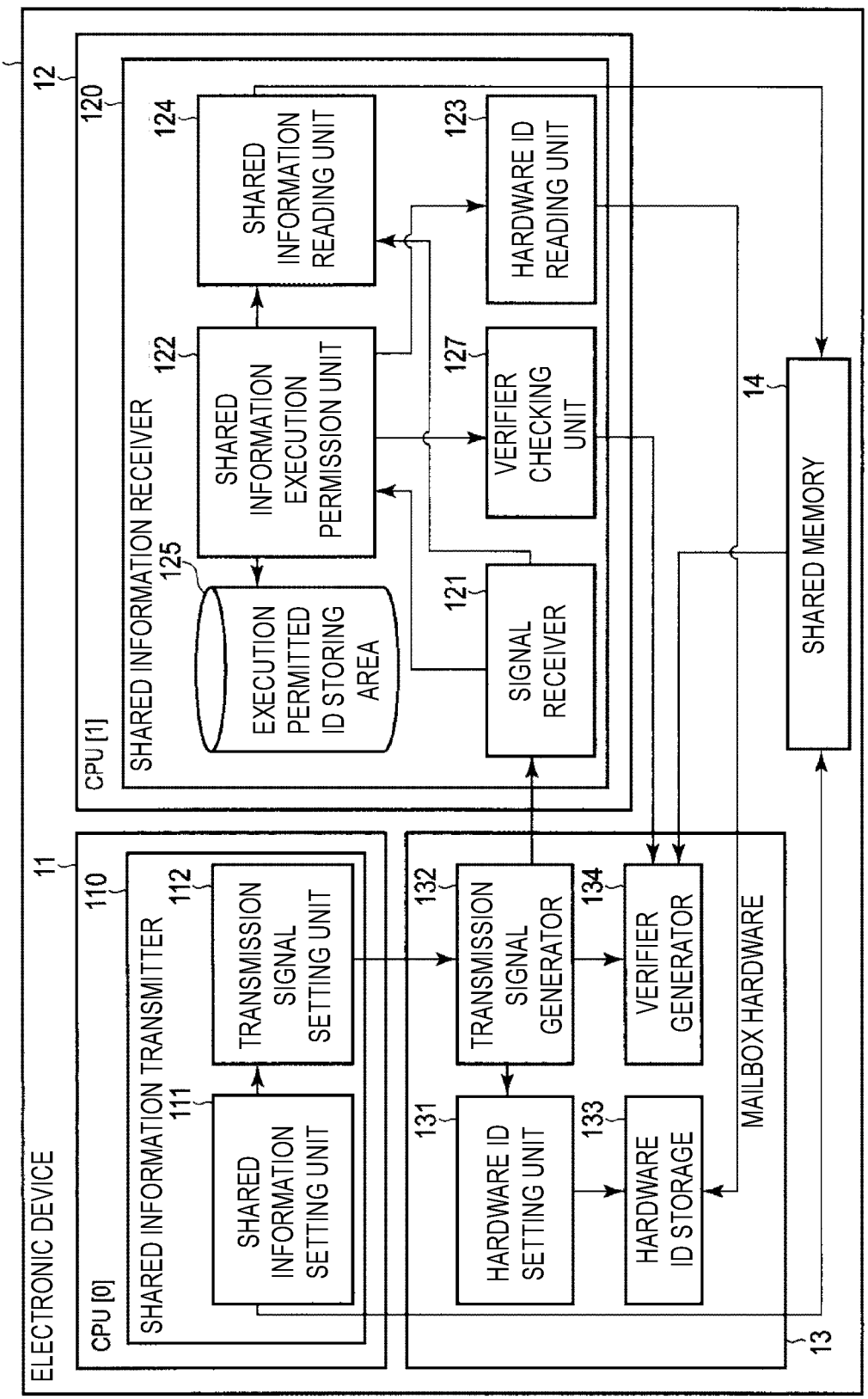
FIG. 10 is a block diagram illustrating a functional configuration of an electronic device according to a third embodiment.

FIG. 10 is a block diagram illustrating a functional configuration of the electronic device 1 according to the embodiment.

As illustrated in FIG. 10, in the embodiment, the shared information receiver 120 includes a verifier checking unit 127, and the mailbox hardware 13 includes a verifier generator 134.

In the embodiment, the verifier generator 134 of the mailbox hardware 13 generates a verifier of data that is stored in the shared memory 14 by the CPU [0] 11. The verifier checking unit 127 of the shared information receiver 120 acquires the verifier from the mailbox hardware 13 and generates a verifier from data retrieved from the shared memory 14, and then compares two verifiers with each other to verify whether falsification by a third party has been performed. As a method of generating a verifier, any method may be used, and SHA256 and the like are representative methods.

When the CPU [0] 11 and the CPU [1] 12 do not share, for example, confidential information for checking each other or checking data to be exchanged, even when the CPU [0] 11 generates a verifier of shared data and stores the verifier in the shared memory 14, the data exchange is vulnerable to a replay attack that replaces each verifier. In the electronic device 1 according to the embodiment, the mailbox hardware 13 generates and stores a verifier at the time of a mailbox transmission signal generation so as to prevent a replay attack to communication data.

Figure 11:
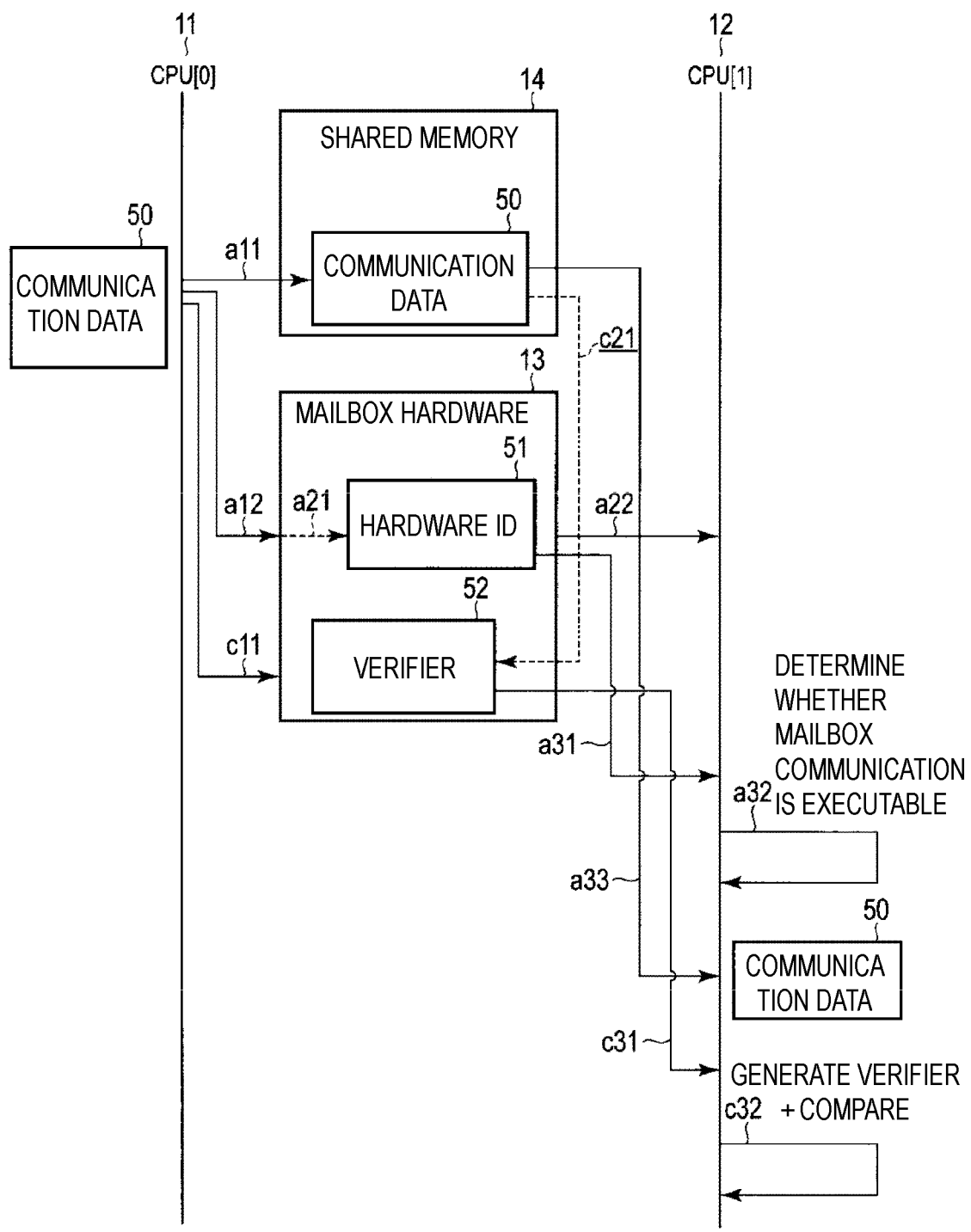
FIG. 11 is a view for explaining the flow of a mailbox communication processing in the electronic device according to the third embodiment.

Here, descriptions will be made on the flow of a mailbox communication processing from the CPU[0] 11 to the CPU [1] 12 in the electronic device 1 according to the embodiment, with reference to FIG. 11.

In the embodiment, the CPU[0] 11 requests that the mailbox hardware 13 generate a mailbox transmission signal (a12), and further requests that the mailbox hardware 13 generate a verifier (c11). Upon receiving this request, the mailbox hardware 13 retrieves communication data 50 from the shared memory 14 by using a pointer received from the CPU[0] 11 when the generation of the mailbox transmission signal is requested, and then generates and stores a verifier 52 of the communication data 50 (c21).

When receiving the mailbox transmission signal, the CPU[1] 12 retrieves the communication data 50 from the shared memory 14 in the same processing flow as that in the first embodiment (a31 to a33). In the embodiment, the CPU[1] 12 further retrieves the verifier 52 from the mailbox hardware (c31). The CPU[1] 12 generates a verifier of the communication data 50 retrieved from the shared memory 14, and compares the two verifiers with each other (c32). When the verifiers match each other, the CPU[1] 12 may determine that the communication data 50 is not falsified, and when the verifiers do not match each other, falsification of the communication data 50 may be detected.

Figure 12:
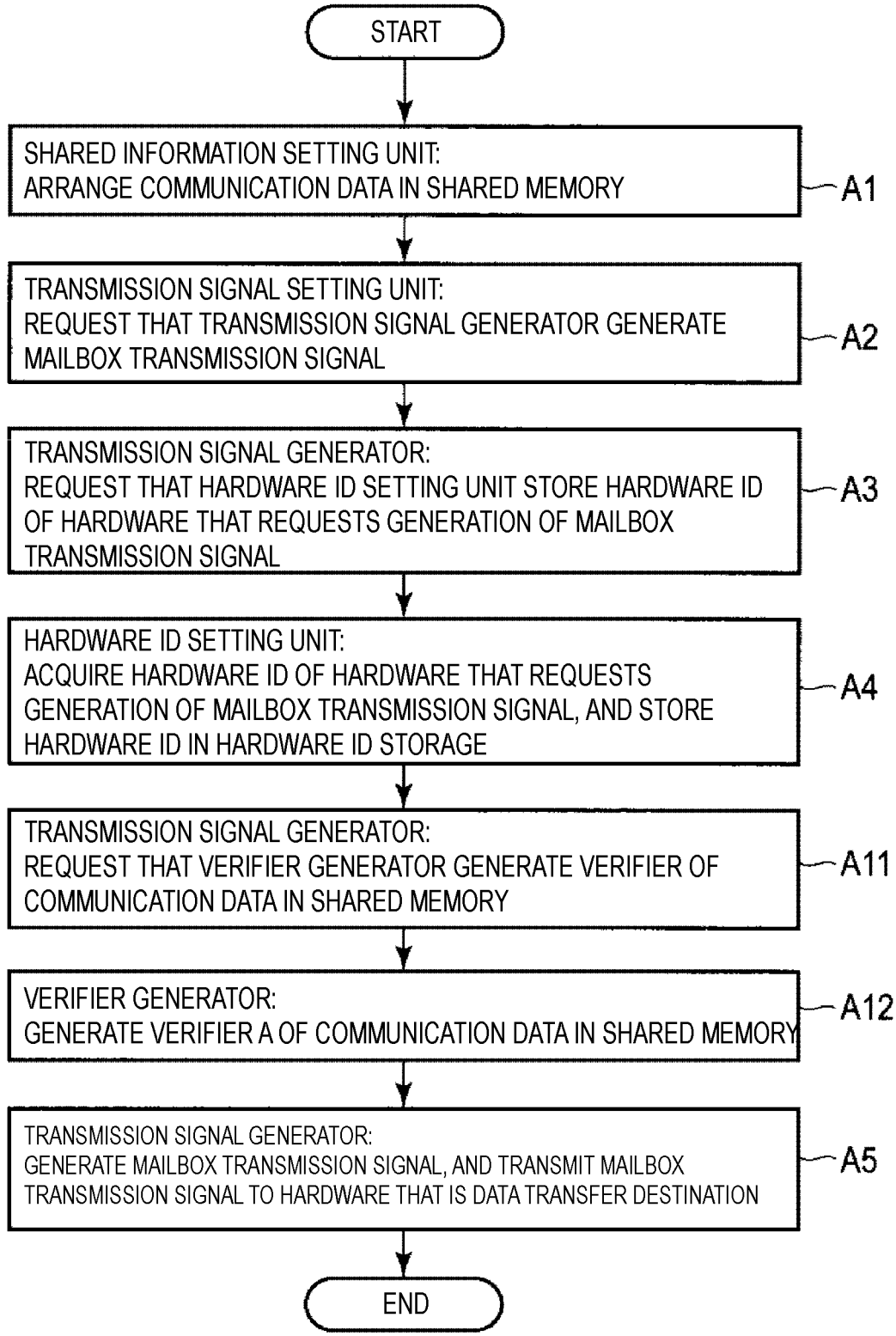
FIG. 12 is a flow chart illustrating steps of mailbox transmission in the electronic device according to the third embodiment.

FIG. 12 is a flow chart illustrating steps of mailbox transmission in the electronic device 1 according to the embodiment. In FIG. 12, step A1 to step A5 correspond to step A1 to step A5 of FIG. 4 illustrated in the first embodiment. In the embodiment, step A11 and step A12 are further executed between step A4 and step A5.

Specifically, in the mailbox hardware 13, when a hardware ID of the CPU[0] 11 is stored by the hardware ID storage 133 (step A4), the transmission signal generator 132 requests that the verifier generator 134 generate a verifier of communication data in the shared memory 14 (step A11). Upon receiving this request, the verifier generator 134 generates the verifier of the communication data in the shared memory 14 (step A12). Here, this verifier is set as a verifier A. Storing the hardware ID in steps A3 to A4, and generating the verifier in steps A11 and A12 may be performed in a reverse order, or may be performed in parallel.

Figure 13:
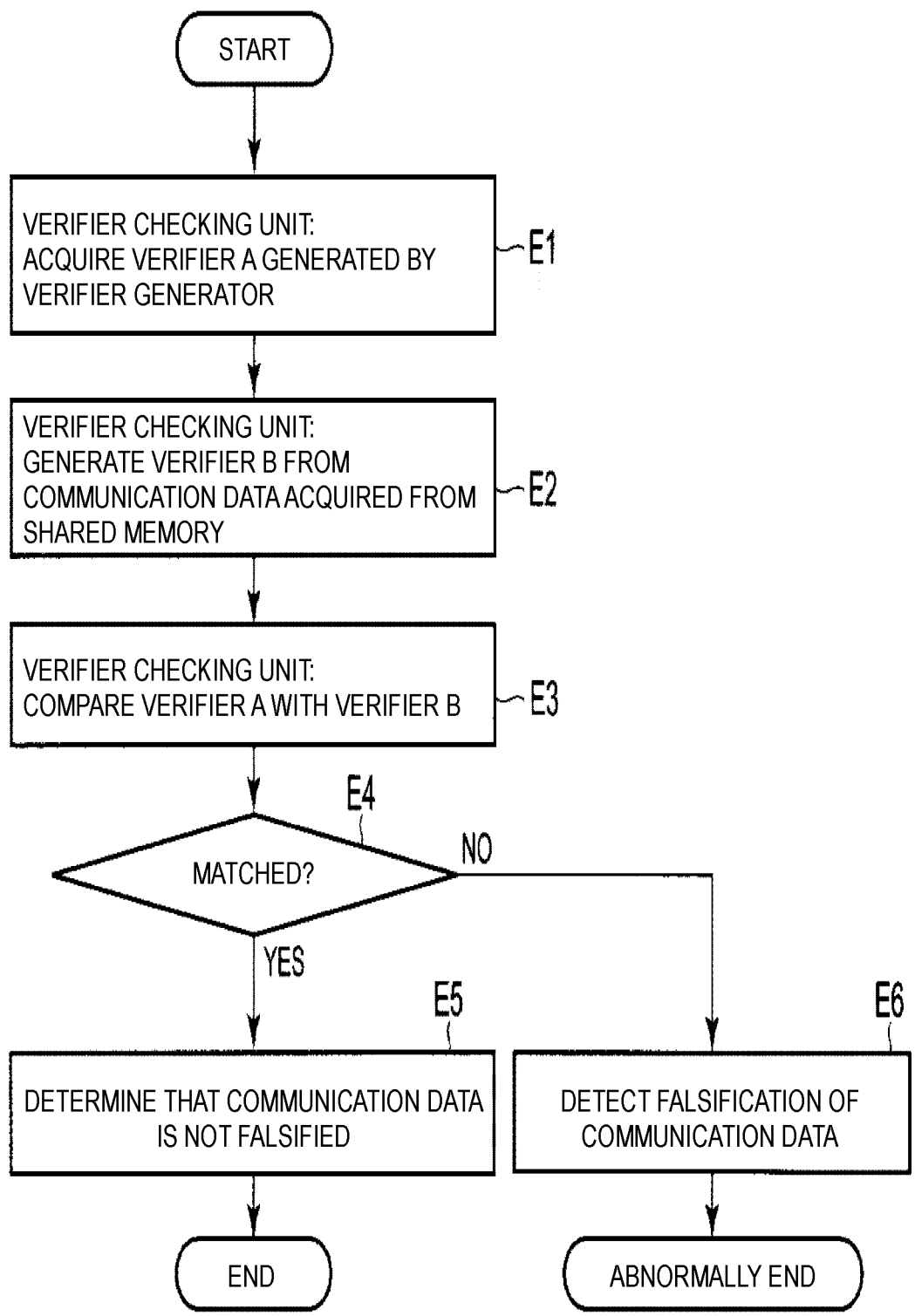
FIG. 13 is a flow chart illustrating steps of data non-falsification verification at the time of mailbox reception in the electronic device according to the third embodiment.

FIG. 13 is a flow chart illustrating steps of non-falsification verification at the time of mailbox reception in the electronic device 1 according to the embodiment. The verifier checking unit 127 acquires the verifier A generated by the mailbox hardware 13, more specifically, by the verifier generator 134 (step E1). The verifier checking unit 127 generates a verifier from communication data acquired from the shared memory 14 by the shared information reading unit 124 (step E2). Here, this verifier is set as a verifier B.

The verifier checking unit 127 compares the verifier A with the verifier B (step E3). When the verifiers match each other (step E4: YES), the verifier checking unit 127 may determine that the communication data acquired from the shared memory 14 is not falsified (step E5), and then ends the non-falsification verification. When the verifiers do not match each other (step E4: NO), the verifier checking unit 127 detects falsification of the communication data acquired from the shared memory 14 (step E6), and then abnormally ends the electronic device 1. For example, the host 2 is notified of the falsification of the communication data, and the electronic device 1 becomes inoperable.

In this manner, the electronic device 1 according to the embodiment further detects a falsification in communication data by a third party. In the electronic device 1 according to the first to third embodiments, descriptions have been made on an example in which a hardware ID stored in the mailbox hardware 13 is used to determine whether reading of data stored in the shared memory 14 is permitted. Meanwhile, the hardware ID may be further used to encrypt the data stored in the shared memory 14. That is, the shared information transmitter 110 may include an encryption unit, and the shared information receiver 120 may include a decryption unit. Accordingly, even when, for example, confidential information for encryption is not shared by a transmission side and a reception side, it is possible to prevent theft of communication data by a third party.

In the electronic device 1 according to the second embodiment, descriptions have been made on an example in which when the CPU[0] 11 transfers data to the CPU[1] 12 via a mailbox communication, the CPU[1] 12 performs a session acceptance processing in order to check whether data in the shared memory 14 is data stored by the CPU[0] 11. In an modification thereof, the CPU[0] 11 notifies, for example, another hardware of a passphrase exchanged with the CPU [1] 12 in advance. Then, under the control of the CPU[0] 11, said another hardware may be allowed to transfer data to the CPU[1] 12 via a mailbox communication. That is, the shared information transmitter 110 may include a controlling unit that allows said another hardware device to transfer data to the CPU[1] 12 via the mailbox communication, more specifically, for example, a session controlling unit that notifies said another hardware of a passphrase exchanged with the CPU[1] 12 in advance, and makes it possible for said another hardware to determine that a corresponding session is acceptable through a session acceptance processing performed by the CPU[1] 12 at the time of a mailbox communication.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. An electronic device comprising:
a first device;
a second device;
a storage area shared by the first device and the second device during mailbox communication between the first device and the second device; and
a mailbox communication controller configured to control the mailbox communication, wherein
in response to the mailbox communication to transmit first data from the first device to the second device,
the first device is configured to
store the first data in the storage area, and
request that the mailbox communication controller generate a mailbox transmission signal for notifying the second device of a data transmission via the mailbox communication,
the mailbox communication controller is configured to
generate the mailbox transmission signal,
transmit the mailbox transmission signal to the second device in response to the request from the first device to generate the mailbox transmission signal, and
obtain an identifier of the first device and store the obtained identifier of the first device in the mailbox communication controller, and
the second device, which has stored therein an identifier of a device permitted to transmit data to the second device via the mailbox communication, is configured to
obtain the identifier of the first device stored in the mailbox communication controller in response to receiving the mailbox transmission signal,
compare the obtained identifier of the first device with the identifier stored in the second device to determine whether acquisition of the first data from the storage area is permitted, and
read the first data from the storage area in response to the acquisition of the first data from the storage area being permitted.

2. The electronic device according to claim 1, wherein the second device is further configured to manage a session during which communication with other devices including the first device is permitted via a bus,
wherein when receiving the mailbox transmission signal in a state where the session has not been established, the second device performs a session acceptance process to determine whether the session is acceptable, and when the session is determined to be acceptable, the second device stores the obtained identifier of the first device stored in the mailbox communication controller in the second device.

3. The electronic device according to claim 2, wherein the mailbox communication controller is further configured to generate a verifier of data stored in the storage area when the mailbox transmission signal is generated, and the second device is further configured to generate a verifier of the data read from the storage area, and to compare the verifier of data read from the storage area with the verifier of data generated by the mailbox communication controller to detect falsification of the data read from the storage area.

4. The electronic device according to claim 3, wherein the first device is further configured to encrypt data to generate the first data to be stored in the storage area using the identifier of the first device, and the second device is further configured to decrypt the first data read from the storage area using the identifier of the first device obtained from the mailbox communication controller.

5. The electronic device according to claim 2, wherein the first device is further configured to notify a third device of information used, by the second device, to determine whether the session is acceptable, and allows the third device to transmit data to the second device via the mailbox communication.

6. The electronic device according to claim 2, wherein after the session is determined to be acceptable, the session is maintained through multiple transmission of data from the first device to the second device.

7. The electronic device according to claim 1, wherein when the obtained identifier of the first device does not match the identifier stored in the second device, the second device prohibits acquisition of the first data from the storage area and then causes the electronic device to become inoperable.

8. The electronic device according to claim 1, wherein the identifier of the first device is a bus identifier assigned to the first device for communication between devices using the bus.

9. The electronic device according to claim 1, wherein the first and second devices are each a central processing unit (CPU) and the storage region is provided in a volatile memory.

10. The electronic device according to claim 1, wherein the first device is configured to store therein an identifier of a device permitted to transmit data to the first device via the mailbox communication.

11. A method of communicating data between a first device and a second device, said method comprising:

storing, by the first device, first data in a storage area shared by the first device and the second device;

requesting, by the first device, a mailbox communication controller to generate a mailbox transmission signal for notifying the second device of a data transmission via a mailbox communication in which data is transmitted and received via the storage area;

obtaining, by the mailbox communication controller, an identifier of the first device;

storing the identifier of the first device in the mailbox communication controller;

generating, by the mailbox communication controller, the mailbox transmission signal;

transmitting the mailbox transmission signal from the mailbox communication controller to the second device in response to the request from the first device;

storing in the second device an identifier of a device permitted to transmit data to the second device via the mailbox communication;

reading the identifier of the first device stored in the mailbox communication controller;

comparing the read identifier of the first device with the identifier stored in the second device to determine whether acquisition of the first data from the storage area is permitted; and reading the first data from the storage area when the acquisition of the first data from the storage area is determined to be permitted.

12. The method according to claim 11, further comprising:

managing by the second device a session during which communication with other devices including the first device is permitted via a bus; and when receiving the mailbox transmission signal in a state where the session has not been established, performing a session acceptance processing to determine whether the session is acceptable, and when the session is determined to be acceptable, storing the identifier of the first device stored in the mailbox communication controller and read by the second device, into the second device.

13. The method according to claim 12, further comprising:

generating by the mailbox communication controller a verifier of data stored in the storage area when the mailbox transmission signal is generated;

generating by the second device a verifier of the data read from the storage area; and comparing the verifier of the data read from the storage area with the verifier of data generated by the mailbox communication controller to detect falsification of the data read from the storage area.

14. The method according to claim 13, further comprising:

encrypting data to generate the first data to be stored in the storage area using the identifier of the first device; and decrypting the first data read from the storage area using the identifier of the first device read from the mailbox communication controller.

15. The method according to claim 12, further comprising:

notifying a third device of information used, by the second device, to determine whether the session is acceptable; and allowing the third device to transmit data to the second device via the mailbox communication.

16. The method according to claim 12, further comprising:

after the session is determined to be acceptable, maintaining the session through multiple transmission of data from the first device to the second device.

17. The method according to claim 11, further comprising:

when the read identifier of the first device does not match the identifier stored in the second device, prohibiting acquisition of the first data from the storage area by the second device.

18. The method according to claim 11, wherein the identifier of the first device is a bus identifier assigned to the first device for communication between devices using the bus.

19. The method according to claim 11, wherein the first and second devices are each a CPU and the storage region is provided in a volatile memory.

\* \* \* \* \*